(12) United States Patent
Wen

(10) Patent No.: US 9,294,374 B2
(45) Date of Patent: Mar. 22, 2016

(54) METHODS AND SYSTEMS FOR DETECTING BURST TRAFFIC

(75) Inventor: Gan Wen, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 134 days.

(21) Appl. No.: 14/117,772

(22) PCT Filed: May 16, 2011

(86) PCT No.: PCT/CN2011/000841
§ 371 (c)(1),
(2), (4) Date: Dec. 16, 2013

(87) PCT Pub. No.: WO2012/155288
PCT Pub. Date: Nov. 22, 2012

(65) Prior Publication Data
US 2014/0112156 A1    Apr. 24, 2014

(51) Int. Cl.
*G01R 31/08* (2006.01)
*H04L 12/28* (2006.01)
*H04L 12/26* (2006.01)
*H04W 24/08* (2009.01)

(52) U.S. Cl.
CPC .......... *H04L 43/0847* (2013.01); *H04L 43/087* (2013.01); *H04L 43/16* (2013.01); *H04W 24/08* (2013.01)

(58) Field of Classification Search
CPC .... G08C 15/00; H04L 12/28; H04L 43/0847; H04L 43/0823; H04L 43/08; G01R 31/08
USPC .............. 370/229–236.1, 241–253, 409–412, 370/400, 352–356
See application file for complete search history.

(56) References Cited

U.S. PATENT DOCUMENTS

| | | | |
|---|---|---|---|
| 5,252,819 A | 10/1993 | Norsworthy | |
| 5,343,465 A * | 8/1994 | Khalil | 370/232 |
| 6,928,473 B1 | 8/2005 | Sumdaram et al. | |
| 7,035,220 B1 * | 4/2006 | Simcoe | 370/236 |
| 7,295,520 B2 * | 11/2007 | Lee et al. | 370/236 |

(Continued)

FOREIGN PATENT DOCUMENTS

| | | |
|---|---|---|
| CN | 101238653 A | 9/2006 |
| JP | 1999239118 A | 8/1999 |
| JP | 2004056433 A | 2/2004 |

*Primary Examiner* — Hanh N Nguyen

(57) ABSTRACT

Presented is an apparatus 200, 300, 400 and methods 500 for detecting any burst error condition on a network 204. The apparatus 200, 300, 400 measures the interval 206, 306, 406 between arriving packets 304, 404 on a network 204 and stores 208 a series of interval measurements for analysis. The apparatus 200, 300, 400 also provides a comparator 212, 322, 324, 426, 428 for determining if a burst error condition 330, 332, 434, 436 occurred. The method 500 shifts the stored interval values 306, 308, 310, 312, 314, 316, 406, 408, 410, 412, 414, 416 based on the arrival 304, 404 of the next packet and its associated interval value and sums 320, 418, 420, 422 a subset of the stored interval values 306, 308, 310, 312, 406, 408, 410, 412 for comparison to a pre-configured period 328, 432 to determine if a burst error condition 332, 436 exists for too few packets. The method 500 provides the sum 318, 418, 420, 422, 424 of a separate subset of stored interval values 308, 310, 312, 314, 316, 406, 408, 410, 412, 414, 416 to another comparator 322, 426 for comparison to a pre-configured period 326, 430 to determine if a burst error condition 330, 434 exists for too many packets.

17 Claims, 6 Drawing Sheets

(56) References Cited

U.S. PATENT DOCUMENTS

| | | |
|---|---|---|
| 8,194,539 B2 * | 6/2012 | Jakobsen et al. ............ 370/230 |
| 2005/0254609 A1 | 11/2005 | Varma et al. |
| 2008/0002677 A1 | 1/2008 | Bugenhagen et al. |
| 2008/0002716 A1 | 1/2008 | Wiley et al. |
| 2008/0049615 A1 | 2/2008 | Bugenhagen |
| 2008/0049624 A1 | 2/2008 | Ray et al. |
| 2008/0049625 A1 | 2/2008 | Edwards et al. |
| 2008/0049632 A1 | 2/2008 | Ray et al. |
| 2008/0049746 A1 | 2/2008 | Morrill et al. |
| 2008/0049747 A1 | 2/2008 | McNaughton et al. |
| 2008/0049775 A1 | 2/2008 | Morrill |
| 2008/0049787 A1 | 2/2008 | McNaughton et al. |
| 2008/0276001 A1 | 11/2008 | Menon |
| 2009/0190481 A1 | 7/2009 | Kobayashi et al. |
| 2010/0085887 A1 | 4/2010 | Ray et al. |

* cited by examiner

METHODS AND SYSTEMS FOR DETECTING BURST TRAFFIC

TECHNICAL FIELD

The present invention relates generally to detecting burst errors in a packet communication check window and more specifically to detecting a burst error in any time interval equal to the time interval of a check window.

BACKGROUND

Typically, packets on a communication network are created in an evenly spaced fashion based on a network interval. However, due to traffic congestion, buffer mechanisms, etc., packets may arrive in a fashion known as a burst condition. A burst condition implies a group of packets are clumped together wherein a greater number of packets than predicted would arrive in a given time period based on the network interval. The difference between the predicted packet interval and the actual packet interval is known as packet jitter and is an important parameter reflecting how a network shapes the packet interval.

Current network systems monitoring packet jitter typically use a common method known as a slipping window to determine packet jitter. In the slipping window method, a master periodically creates a packet based on a pre-configured interval $T_{send}$ and sends the packet towards a slave. In theory, during any pre-configured interval $T_{receive}$, the slave should receive at least M packets and should receive no more than N packets i.e. N≥M. If the slave receives a number of packets outside of this range then an alarm is generated indicating a burst error. The interval $T_{receive}$ is known as a check window and is typically chosen as three times $T_{send}$ or in other words, $T_{receive}/T_{send}$ equals three.

Problems with the slipping window method arise based on the arbitrary nature of the selection of when to begin and end a check window. As illustrated in FIG. 1 for example, first divide each check window into three equal sub-check windows and record the number of packets received for each sub-check window as c(1), c(2), ..., c(n). Next, let P(i), with i≥1, be the received number of packets in the i-th check window. Accordingly the total number of packets received in the i-th check window is P(i)=c(i)+c(i+1)+c(i+2). Next in the example, determine if P(i)∈[N,M], if the total number of packets is not a member of the specified range then a burst error alarm is generated.

The simplicity of the slipping window method lends itself to hardware implementation and therefore makes the method very attractive, but the slipping window method can fail to report some burst error conditions. For example, looking again to FIG. 1, no burst error is reported based on the slipping window method even though check windows can be defined where a burst error condition occurs. The issue with the slipping window method is that burst errors are only reported on the selected check windows, not on every possible check window. Using the slipping window method, to detect all possible burst errors, the sub-windows would have to be made infinitely small, which would make the slipping window method impractical to implement. Accordingly, market pressure is building for a method of detecting all burst errors in a packet network with the method being practical to implement in hardware or software.

SUMMARY

Apparatus and methods address the market needs described above by providing the capability to detect every burst error condition that occurs on a network for a pre-configured period. The apparatus and methods measure the interval between incoming packets and calculate a total interval time based on a pre-configured number of packets and as expected period for the number of packets. The apparatus and methods store a series of these measured values and provide the data to summation points for accumulating the values. The apparatus and methods further provide the accumulated values to a comparator for a determination if a burst error condition has occurred, the burst error condition can be a result of too few or too many packets received during the pre-configured period. Accordingly, the apparatus and methods can generate an alarm signal if a burst error condition is detected.

In one exemplary method embodiment, the burst error detection device measures the interval between each consecutive packet. In another aspect of the exemplary method embodiment, the burst error detection device records the interval measurement by recording the interval value in a memory element of a memory chain. In the exemplary method embodiment, the memory chain comprises a series of memory elements where the values stored in the memory elements can be shifted from one memory element to the next memory element. Continuing with the exemplary method embodiment, the burst error detection device sums the interval values from one portion of the memory chain and provides the summation to a comparator where the summation is compared to a pre-configured period. In the exemplary embodiment, if the summation is greater than the pre-configured period then a burst error is detected for receiving fewer packets during the period than required. Further in the exemplary method embodiment, the burst error detection device sums the interval values from another portion of the memory chain and provides the summation to another comparator where the summation is compared to a pre-configured period. In the exemplary embodiment, if the summation is less than the pre-configured period then a burst error is detected for receiving more packets during the period than allowed.

In another exemplary method embodiment, the burst error detection device measures the interval between each consecutive packet. In another aspect of the exemplary method embodiment, the burst error detection device records the interval measurement by recording the interval value in a memory element of a memory chain. In the exemplary method embodiment, the memory chain comprises a series of memory elements where the values stored in the memory elements can be shifted from one memory element to the next memory element. Continuing with the exemplary method embodiment, the burst error detection device adds the new interval value to each interval value transitioning from one memory element to another memory element of the memory chain and provides the interval value from an intermediate memory element to a comparator where the summation is compared to a pre-configured period. In the exemplary embodiment, if the summation is greater than the pre-configured period then a burst error is detected for receiving fewer packets during the period than required. Further in the exemplary method embodiment, the burst error detection device provides the interval value from the last memory element in the memory chain to another comparator where the interval value is compared to a pre-configured period. In the exemplary embodiment, if the summation is less than the pre-configured period then a burst error is detected for receiving more packets during the period than allowed.

In yet another exemplary embodiment, a device is provided for detecting any burst error condition on a network. Continuing with the exemplary embodiment, the burst error detection device comprises an interval counter component for determining an interval between consecutively arriving packets, a memory chain component for providing storage locations for consecutive interval values, a summation component for providing the capability to combine a plurality of interval values and a comparator component for comparing the combined plurality of interval values to a pre-configured period and determining if a burst error condition exists.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
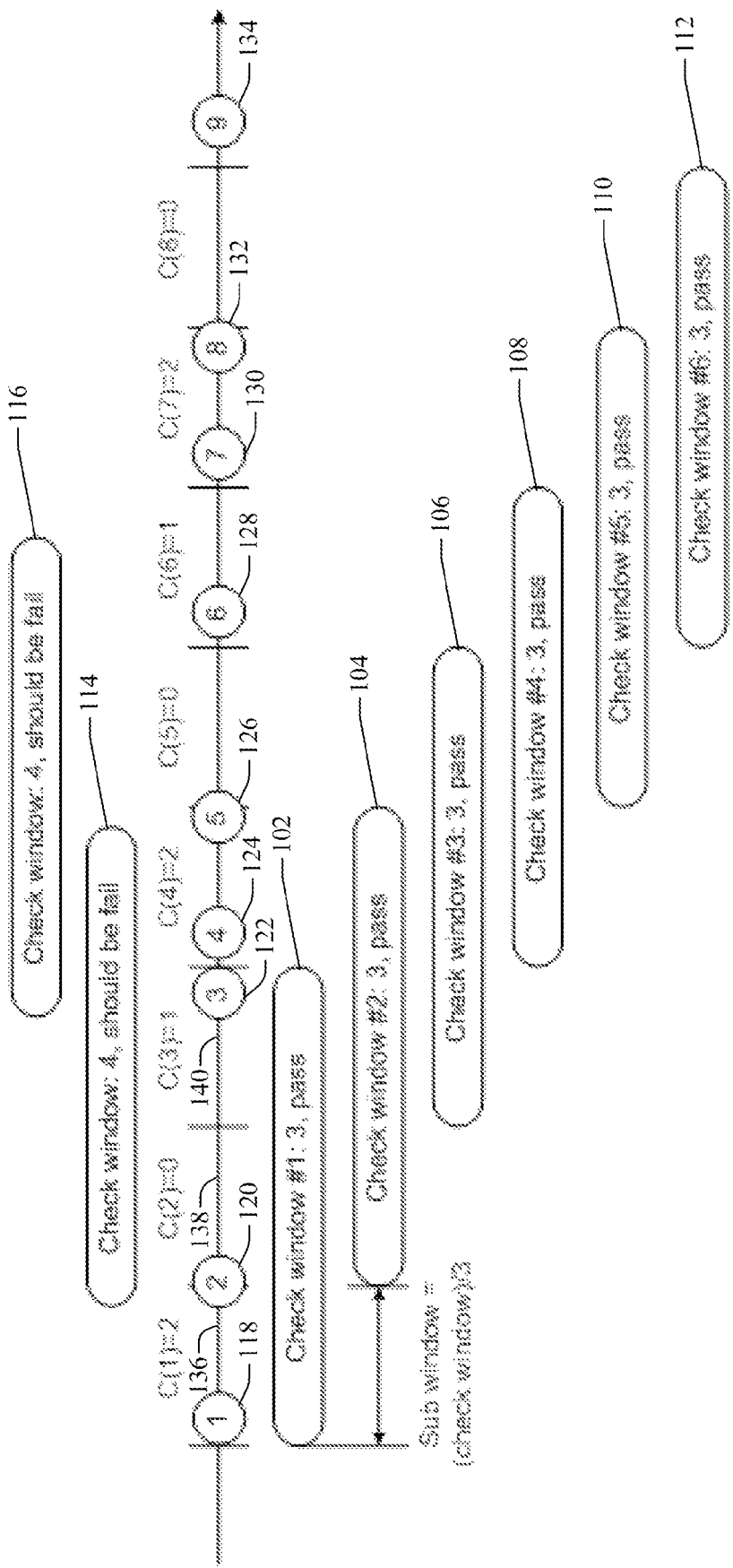
FIG. 1 depicts a prior art method of detecting burst errors on a packet network and illustrating circumstances when the prior art method will fail to detect burst errors.

Looking first to FIG. 1, a diagram 100 of a prior art method of detecting burst errors on a packet network is illustrated and will provide a context for describing the exemplary embodiments provided herein. The prior art method uses a slipping check window and divides the check window into a pre-defined number of sub-check windows, three in this example of the prior art. The method then records the number of packets 118, 120, 122, 124, 126, 128, 130, 132, 134 received in each sub-check window and sums the number of packets 118, 120, 122 received for three sequential sub-check windows 136, 138, 140 comprising a check window 102. For this prior art method, a new check window begins at each sub-check window boundary as illustrated by check windows 102, 104, 106, 108, 110 and 112. If the number of packets received 118, 120, 122 is less than the minimum number expected to arrive or greater than the maximum number expected to arrive then a burst error alarm is generated.

As illustrated by check windows 114, 116 exhibiting alarm conditions, this method fails to detect burst error alarms for every possible location of a check window not aligned with a sub-check window boundary. Consequently, burst error alarm conditions are missed providing an inaccurate view of the health of the packet network.

Looking now to the exemplary embodiments associated with this disclosure, the necessary and sufficient conditions of at least a minimum number (M) of packets and at most a maximum number (N) of packets during a specified time period (T) can also be described as the sum of any M continuous packet intervals should be less than or equal to T and the sum of any N continuous packet intervals should be greater than or equal to T as the theory behind the exemplary embodiments. For the sake of clarity in the exemplary embodiments, it is assumed that a packet will be counted into a check window only if the packet arrives during the check window or at the starting point of a check window, a packet arriving at the ending point of a check window will not be counted in said check window.

Examining the condition of necessity for the exemplary embodiments, suppose there is a period T in which the received packet number is less than M. For example, let $i(k)$, $(k \geq 1)$ be the first packet interval in T and note that the packet interval may not be complete. Continuing with the exemplary embodiment, the period T can be represented as:

$$T = \text{part}(i(k)) + i(k+1) + \ldots + i(k+m-1) + \text{part}(i(k+m)),$$
with $m \leq M-1$. Where $i(k+j), (j=0, 1, \ldots m)$ represents the $(j+1)$-th packet interval among the $(m+1)$ consecutive packet intervals, and $\text{part}(i(j))$ represents part of the $(j+1)$-th packet interval, therefore it meets $0 \leq \text{part}(i(j)) \leq i(j)$. Particularly, when $m=M-1$, it should meet: $\text{part}(i(k)) < i(k)$ when $\text{part}(i(k+m)) > 0$ and $\text{part}(i(k)) = i(k)$ when $\text{part}(i(k+m)) = 0$. Thus, for $m=M'1$, $T < i(k) + i(k+1) + \ldots + i(k+M-1)$ and for $m < M-1$, $T \leq i(k) + i(k+1) + \ldots + i(k+m-1) < i(k) + i(k+1) + \ldots + i(k+M-1)$. Therefore, because the right most part represents a packet interval summation in which M packet intervals are added, and its value is larger than T, it conflicts with the assumption that the sum of any M continuous packet intervals should be less than or equal to the period T.

Similarly, suppose there is a period T containing more than N packets, then period T can be represented as:

$$T = \text{part}(i(k)) + i(k+1) + \ldots + \text{part}(i(k+m)) \text{ with } m \geq N+1.$$
Particularly, when $m=N+1$, it should *meet:*

$\text{part}(i(k)) < i(k)$ when $\text{part}(i(k+m)) > 0$ and $\text{part}(i(k)) = i(k)$ when $\text{part}(i(k+m)) = 0$. Thus, for $m = N+1$, $T > i(k+1) + i(k+2) + \ldots + i(k+N)$ and for $m > N+1$, $T \geq i(k+1) + \ldots + i(k+m-1) > i(k+1) + i(k+2) + \ldots + i(k+N)$. Therefore, because there are N packet intervals added to the rightmost part and the sum is less than or equal to T, the result conflicts with the assumption that the sum of any N continuous packet intervals are greater than or equal to the period T.

Turning now to the condition of sufficiency for the exemplary embodiments, similarly suppose there is a packet interval sequence which contains M packet intervals: $i(k)$, $i(k+1) \ldots i(k+M-1)$ $(k \geq 1)$ with its packet interval summation $i(k)+i(k+1)+\ldots+i(k+M-1) > T$. Then there is a period T which can be represented as: $T = \text{part}(i(k)) + i(k+1) + \ldots + \text{part}(i(k+m))$, with $m \leq M-1$ and particularly, let $\text{part}(i(k+m)) = i(k+m)$ and $\text{part}(i(k)) < i(k)$ when $m = M-1$. Accordingly, during T, at most (M−1) packets are received and there is a conflict with the assumption that at least M packets are received during any period T. Similarly, suppose there is a packet interval sequence, consisting of N intervals, $i(k+1) + i(k+2) + \ldots + i(k+N) < T$:

$$i(k+1)) + i(k+2) + \ldots + i(k+N) < T.$$

Therefore, we can find a period T that can be represented as: $T = \text{part}(i(k)) + i(k+1) + \ldots + \text{part}(i(k+m))$ with $m \geq N+1$ and particularly let $\text{part}(i(k)) > 0$ and $\text{part}(i(k+m)) > 0$ when $m = N+1$. Accordingly, during T, at least (N+1) packets are received and there is a conflict with the assumption at most N packets are received during any period T.

It should be noted in the exemplary embodiments that: T=selected period; M=minimum number of packets for the selected period; N=maximum number of packets for the selected period; i(k)=the kth packet interval is the first packet interval of a period; i(k+j)=the (k+j)th packet interval; i(k+m)=the (m+1)th packet interval and is the last packet interval of a period; and j, k, m=are variables to denote the packet interval number.

Figure 2:
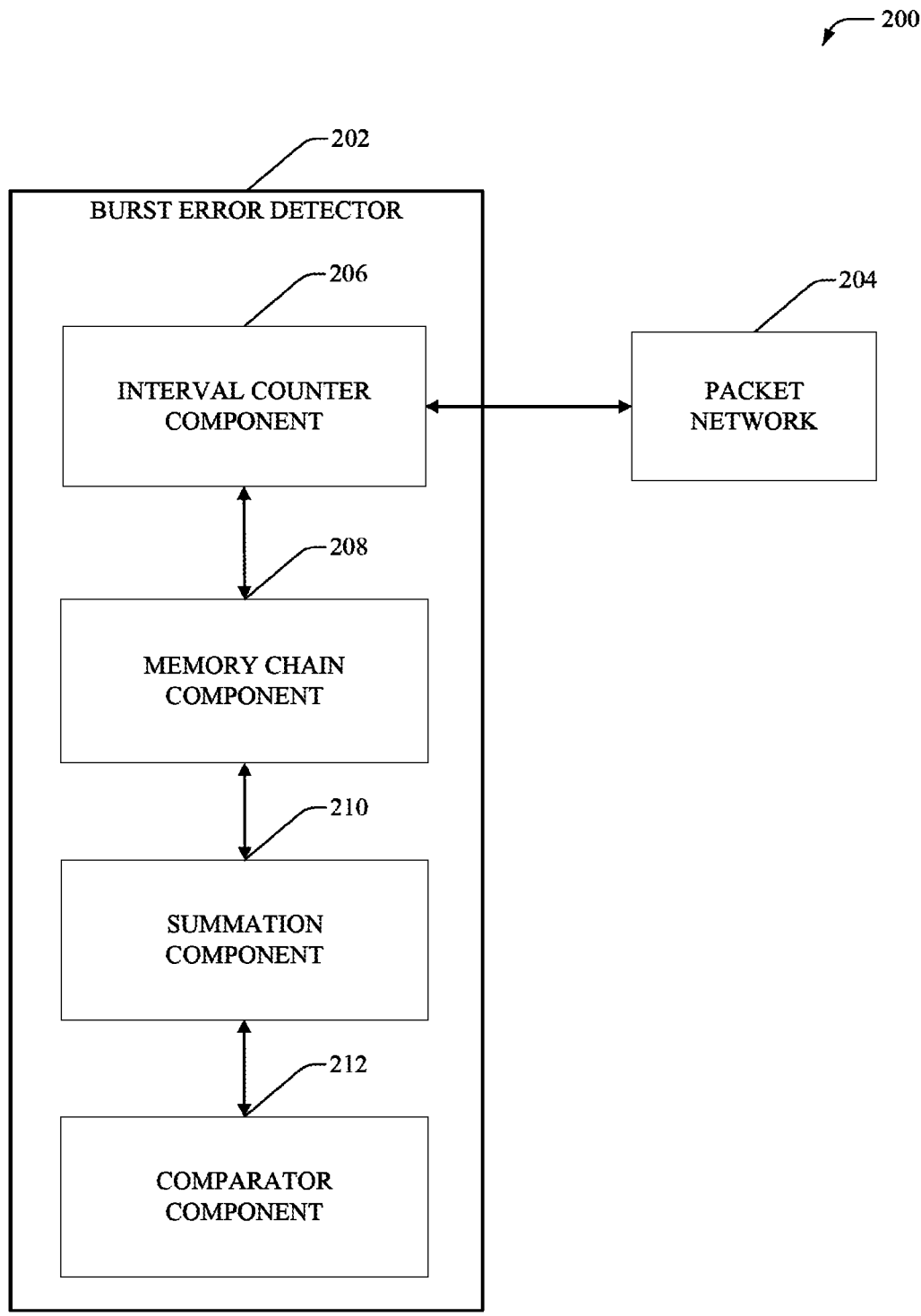
FIG. 2 depicts a burst error detection device for monitoring packet network traffic, detecting a burst error condition and generating a burst error alarm.

Looking now to FIG. 2, an exemplary embodiment 200 of a burst error detection device 202 connected to a packet network 204 is depicted. Further, exemplary embodiment 200 depicts the burst error detector 202 including an interval counter component 206, a memory chain component 208, a summation component 210 and a comparator component 212. In one aspect of the exemplary embodiment 200 the interval counter component 206 counts the interval time between two adjacent incoming packets. Continuing with the exemplary embodiment, the interval counter component 206 increments on each clock cycle and the interval counter component 206 is reset by the next incoming packet. It should be noted in the exemplary embodiment that the interval counter component 206 can increment by one but is not limited to incrementing by one and can increment by other values. Further, it should be noted in the exemplary embodiment that part of resetting by the next incoming packet is transferring the current interval count to one of the memory locations in the memory chain component 208.

Continuing with the exemplary embodiment, the memory chain component 208 comprises memory elements for storing previous packet interval counter values. Upon the arrival of each new interval counter value from the interval counter component 206, the interval counter value in each memory element is shifted to the next memory element preserving the newest series of interval counter values and discarding the oldest interval counter value. It should be noted in the exemplary embodiment that all memory elements are reset when the burst error detector device 202 is initialized. Further in the exemplary embodiment, it should be noted that the number of memory elements configured in the memory chain component 208 is determined based on the selected packet network interval and the minimum and maximum number of packets expected to arrive in said packet network interval.

Next in the exemplary embodiment, the summation component 210, comprising one or more totalizers configured either to sum all the values stored in the memory elements for presentation to the associated comparator component 212 or for summing the newly arrived interval count with the interval count shifting from a previous memory element to the next memory element.

The exemplary embodiment continues with the comparator component 212, comprising one or more comparators for determining if the interval count for the received packets is smaller and/or larger than the respective configured period. It should be noted that the comparator component 212 evaluates the condition with the arrival of each packet. Further it should be noted that the comparator component 212 outputs an alarm indication if a determination is made that fewer than required or more than allowed packets are received.

Figure 3:
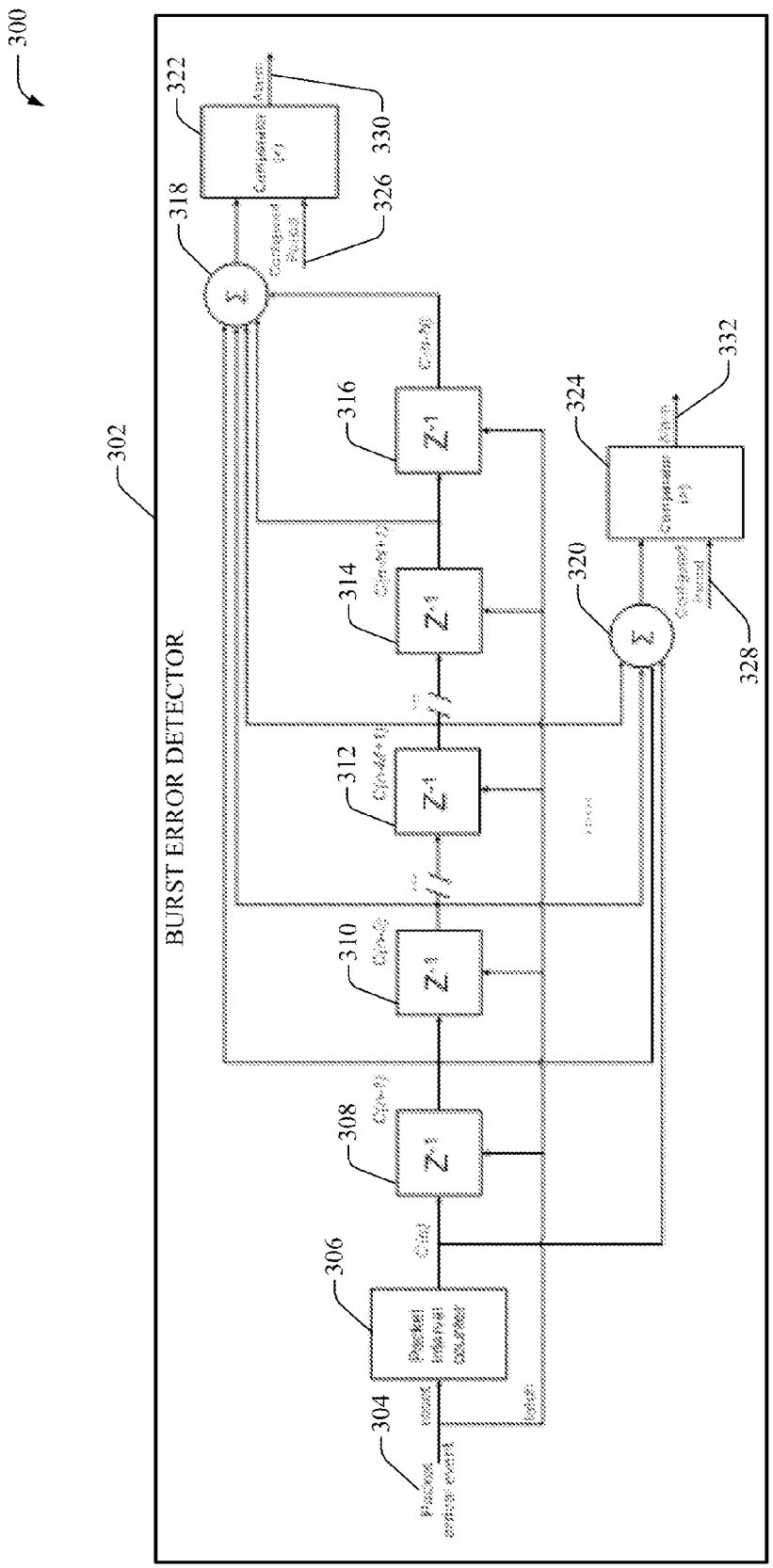
FIG. 3 depicts a schematic of a burst error detection device for monitoring packet network traffic, detecting a burst error condition and generating a burst error alarm, including a packet interval counter, a series of memory storage locations and two comparators.

Turning now to FIG. 3, an exemplary embodiment schematic 300 of a burst error detector 302 is depicted. Further, exemplary embodiment 300 depicts the burst error detector 302 and its associated interval counter 306, memory elements 308, 310, 312, 314 and 316, summation points 318 and 320 and comparators 322 and 324. In one aspect of exemplary embodiment 300, a packet is detected as arriving 304 at the interval counter 306. In another aspect of the exemplary embodiment, based on the arrival of the packet, the interval counter values are simultaneously shifted from the interval counter 306 to memory element 308, from memory element 308 to memory element 310, from memory element 310 to memory element 312, from memory element 312 to memory element 314 and from memory element 314 to memory element 316.

Continuing with the exemplary embodiment and again based on the arrival of the packet, the interval counter values from the packet interval counter 306, memory element 308, memory element 310 and memory element 312 are also sent to summation point 320 where the interval counter values are summed and provided to comparator 324. In a like fashion of the exemplary embodiment, the interval counter values from memory element 308, memory element 310, memory element 312, memory element 314 and memory element 316 are sent to summation point 318 where the interval counter values are summed and provided to comparator 322.

Further in the exemplary embodiment, comparator 324 compares the summed interval counter value with the configured period 328 and if the summed interval counter value is greater than the configured period then an alarm 332 is generated indicating that fewer than the required number of packets were received for the configured period 328. It should be noted in the exemplary embodiment that the continuous packet interval values from the packet interval counter 306 and memory elements 308, 310 and 312 are summed together as the sum from k=0 to M−1 of c(n−k) and compared to the configured period 328 and if the sum is greater than the configured period 328 then an alarm 332 is generated indicating that fewer than the required number of packets were received for the configured period 328. It should further be noted in the exemplary embodiment that the summation does not begin with k=1 because the value of c(n) is dynamically incremented in order to generate a burst error alarm immediately under a startup burst error condition. For example, if a communication link failure occurs prohibiting the reception of any further packets and the summation began with k=1 then a burst error alarm for not receiving the minimum number of packets might not be generated even though the c(n) term is becoming very large.

In another aspect of the exemplary embodiment, comparator 322 compares the summed interval value with the configured period 326 and if the summed interval value is less than the configured period 326 then an alarm 330 is generated indicating greater than the maximum allowable packets have been received for the configured period. It should be noted in the exemplary embodiment that the continuous packet interval values from memory elements 308, 310, 312, 314 and 316 are summed together as the sum from k=1 to N of c(n−k) and compared to the configured period 326 and if the sum is less than the configured period 326 then an alarm 330 is generated indicating that greater than the maximum number of packets were received for the configured period 326. It should further be noted in the exemplary embodiment that the summation does not begin with k=0 because some false alarms can be generated when the value of c(n) is small. It should also be noted that the greater than maximum burst error alarm cannot be immediately generated at startup because all the memory elements were initially reset, i.e. all memory elements must contain interval values before this error can be generated.

Figure 4:
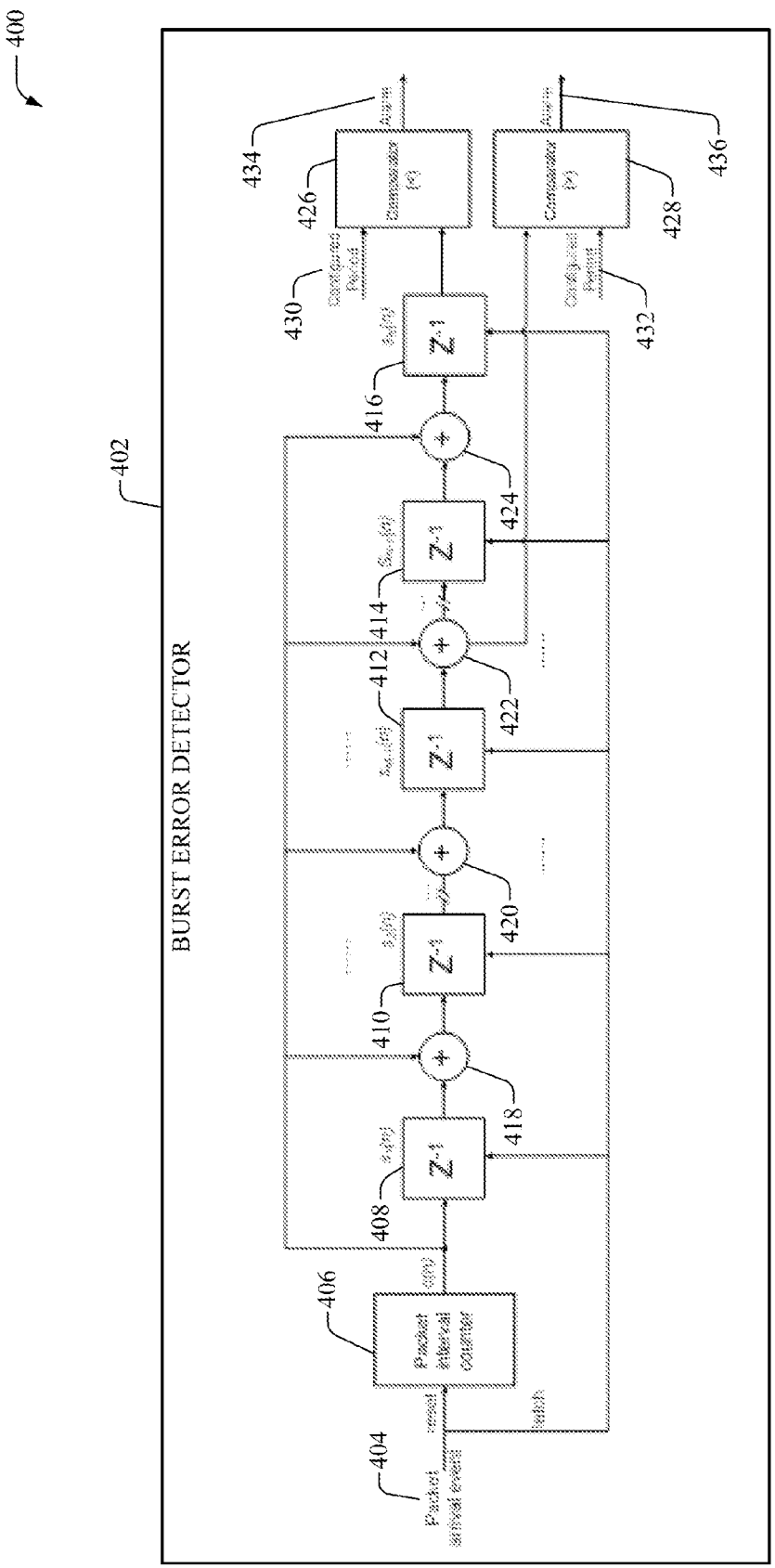
FIG. 4 depicts a schematic of an alternative burst error detection device for monitoring packet network traffic, detecting a burst error condition and generating a burst error alarm, including a packet interval counter, a series of memory storage locations and two comparators.

Turning now to FIG. 4, another exemplary embodiment 400 of a burst error detector is depicted. Further, exemplary embodiment 400 depicts the burst error detector 402 and its associated interval counter 406, memory elements 408, 410, 412, 414 and 416, summation points 418, 420, 422 and 424 and comparators 426 and 428. In one aspect of exemplary embodiment 400, a packet is detected as arriving 404 at the interval counter 406. In another aspect of the exemplary embodiment, based on the arrival of the packet, the interval counter summation is simultaneously shifted from the interval counter 406 to memory element 408, from memory element 408 to memory element 410, from memory element 410 to memory element 412 or to any additional consecutive intermediate memory elements in like fashion, from memory element 412 to memory element 414 or to any additional consecutive intermediate memory elements in like fashion and from memory element 414 to memory element 416.

Continuing with the exemplary embodiment 400, the packet interval determined based on the same packet arrival, and output from the packet interval counter 406, is added to the interval counter values shifting from memory element 408 to memory element 410 by summation point 418, from memory element 410 to memory element 412 by summation point 420 or between any additional consecutive intermediate memory elements by additional summation points in like fashion, from memory element 412 to memory element 414 by summation point 422 or between any additional consecutive intermediate memory elements by additional summation points in like fashion and from memory element 414 to memory element 416 by summation point 424. Concurrent, in the exemplary embodiment, with the packet arrival event and the shifting packet interval values, the summed packet interval value from summation point 422 is sent to comparator 428 where it is compared to configured period 432 and if the packet interval value is greater than the configured period 432 then an alarm 436 is generated indicating fewer than the expected number of packets have been received for the configured period. Similarly in the exemplary embodiment and also concurrent with the packet arrival event 404, the packet interval value from memory element 416 is sent to the comparator 426 where it is compared to configured period 430 and if the packet interval value is less than the configured period 430 then an alarm 434 is generated indicating a greater than expected number of packets have been received for the configured period.

Figure 5:
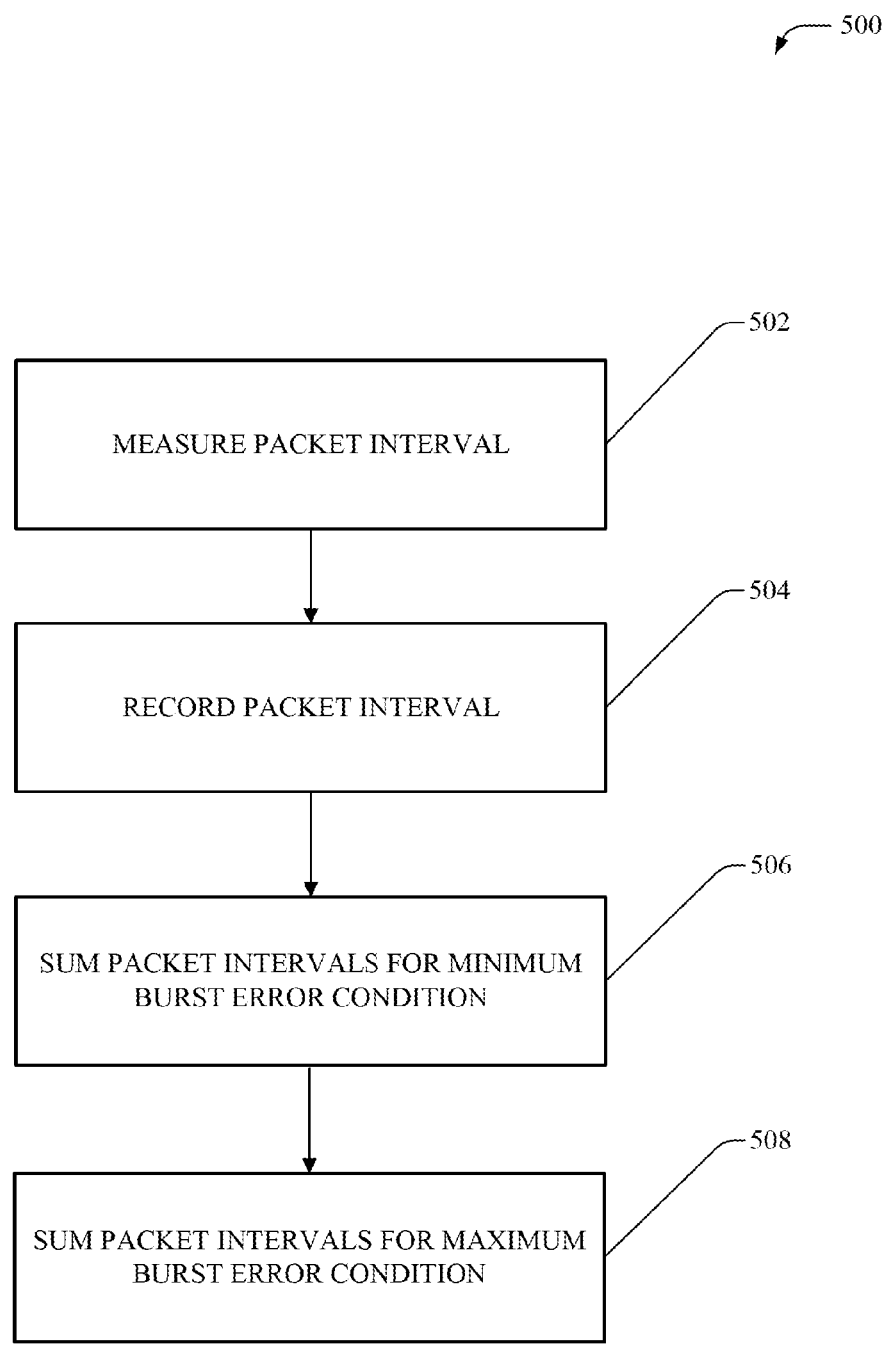
FIG. 5 depicts a method of detecting every burst error condition for a packet network.

Turning now to FIG. 5, an exemplary method embodiment 500 based on detecting a burst error condition on a network is depicted. Starting at exemplary method embodiment step 502, the interval between two consecutive packets is measured by an interval counter component 206. Continuing at step 504 of the exemplary method embodiment, the measured interval value is recorded in a memory element of memory chain component 208. It should be noted in the exemplary embodiment that the measured interval value is stored as part of shifting the interval values stored in the memory chain component 208 from one memory element location to the next memory element location in the memory chain component 208.

Next, in exemplary method embodiment step 506, a plurality of interval values are summed and provided to a comparator 212 for a comparison with a pre-configured period and a determination if a less than required number of packets burst error condition has occurred. Continuing at step 508 of the exemplary method embodiment, a different plurality of interval values are summed and provided to the comparator 212 for a comparison with a pre-configured period and a determination if a greater than the allowable number of packets burst error condition has occurred. It should be noted in the exemplary embodiment that separate comparators can be used for the two comparisons and the pre-configured periods for used by the comparators can be different values. It should also be noted in the exemplary embodiment that exemplary embodiment step 506 and exemplary embodiment step 508 can also independently generate an alarm signal based on the determination that a burst error condition has occurred.

Figure 6:
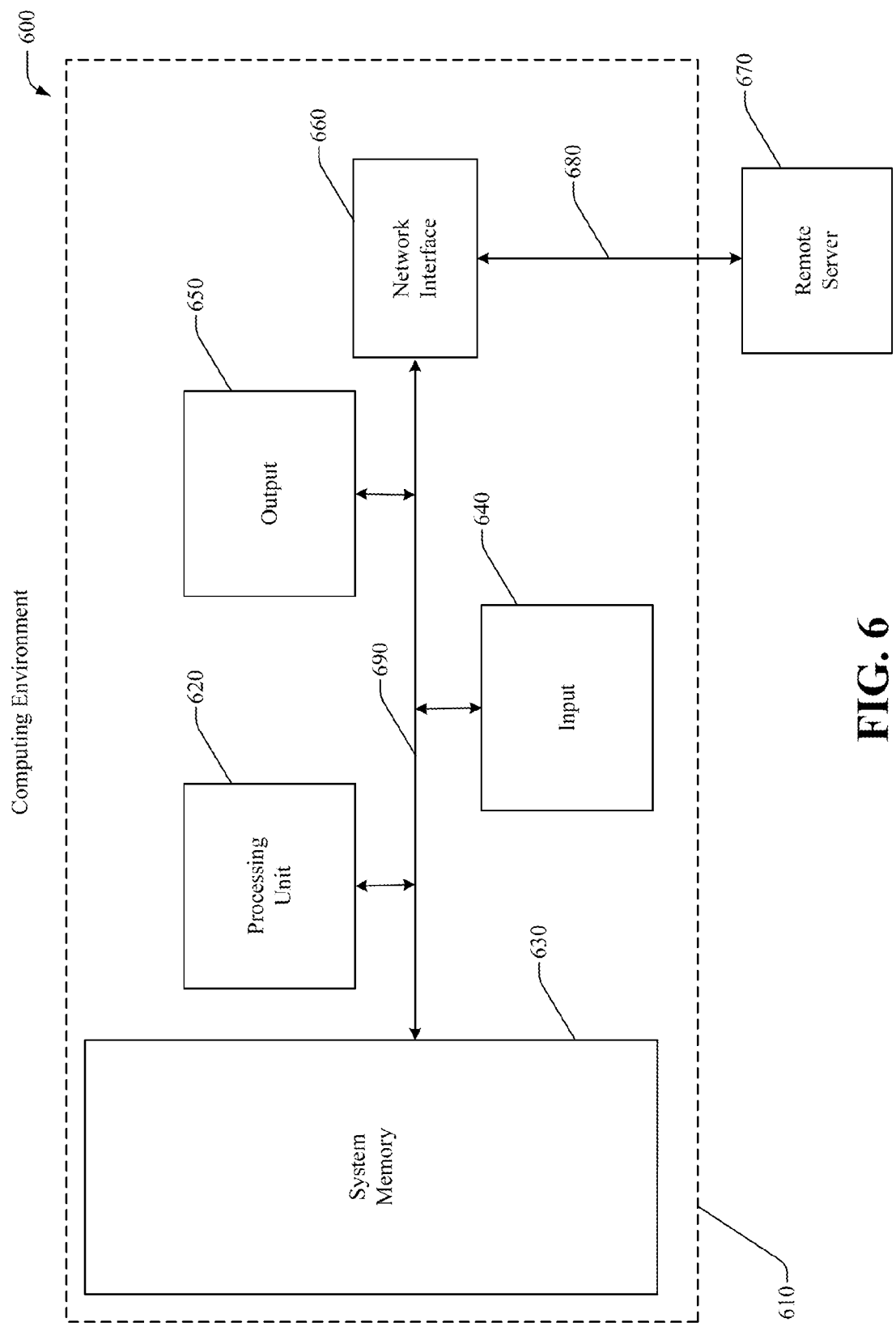
FIG. 6 depicts an exemplary computing device for implementing a burst error detection device.

FIG. 6 illustrates an example of a suitable computing system environment 600 in which the claimed subject matter can be implemented, although as made clear above, the computing system environment 600 is only one example of a suitable computing environment for an exemplary embodiment and is not intended to suggest any limitation as to the scope of use or functionality of the claimed subject matter. Further, the computing environment 600 is not intended to suggest any dependency or requirement relating to the claimed subject matter and any one or combination of components illustrated in the example computing environment 600.

Looking now to FIG. 6, an example of a device for implementing the previously described innovation includes a general purpose computing device in the form of a computer 610. Components of computer 610 can include, but are not limited to, a processing unit 620, a system memory 630, and a system bus 690 that couples various system components including the system memory to the processing unit 620. The system bus 690 can be any of several types of bus structures including a memory bus or memory controller, a peripheral bus, and a local bus using any of a variety of bus architectures.

Computer 610 can include a variety of computer readable media. Computer readable media can be any available media that can be accessed by computer 610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media can embody computer readable instructions, data structures, program modules or other data in a modulated data signal such as a carrier wave or other transport mechanism and can include any suitable information delivery media.

The system memory 630 can include computer storage media in the form of volatile and/or nonvolatile memory such as read only memory (ROM) and/or random access memory (RAM). A basic input/output system (BIOS), containing the basic routines that help to transfer information between elements within computer 610, such as during start-up, can be stored in memory 630. Memory 630 can also contain data and/or program modules that are immediately accessible to and/or presently being operated on by processing unit 620. By way of non-limiting example, memory 630 can also include an operating system, application programs, other program modules, and program data.

The computer 610 can also include other removable/non-removable and volatile/nonvolatile computer storage media. For example, computer 610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 690 through a non-removable memory interface such as an interface, and a magnetic disk drive or optical disk drive can be connected to the system bus 690 by a removable memory interface, such as an interface.

A user can enter commands and information into the computer 610 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 620 through user input 640 and associated interface(s) that are coupled to the system bus 690, but can be connected by other interface and bus structures, such as a parallel port, game port or a universal serial bus (USB).

A graphics subsystem can also be connected to the system bus 690. In addition, a monitor or other type of display device can be connected to the system bus 690 through an interface, such as output interface 650, which can in turn communicate with video memory. In addition to a monitor, computers can also include other peripheral output devices, such as speakers and/or printing devices, which can also be connected through output interface 650.

The computer 610 can operate in a networked or distributed environment using logical connections to one or more other remote computers, such as remote server 670, which can in turn have media capabilities different from device 610. The remote server 670 can be a personal computer, a server, a router, a network PC, a peer device or other common network node, and/or any other remote media consumption or transmission device, and can include any or all of the elements described above relative to the computer 610. The logical connections depicted in FIG. 6 include a network 680, such as a local area network (LAN) or a wide area network (WAN), but can also include other networks/buses.

When used in a LAN networking environment, the computer 610 is connected to the LAN 680 through a network interface or adapter. When used in a WAN networking environment, the computer 610 can include a communications component, such as a modem, or other means for establishing communications over a WAN, such as the Internet. A communications component, such as a modem, which can be internal or external, can be connected to the system bus 690 through the user input interface at input 640 and/or other appropriate mechanism.

In a networked environment, program modules depicted relative to the computer 610, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device implementing a virtual keyboard. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

Further, the term to "infer" or "inference" refer generally to the process of reasoning about or inferring states of the system, environment, user, and/or intent from a set of observations captured from events and/or data. Captured events and data can include user data, device data, environment data, behavior data, application data, implicit and explicit data, etc. Inference can be employed to identify a specific context or action, or can generate a probability distribution over states, for example. The inference can be probabilistic in that the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The above-described exemplary embodiments are intended to be illustrative in all respects, rather than restrictive, of the present innovation. Thus the present innovation is capable of many variations in detailed implementation that can be derived from the description contained herein by a person skilled in the art. All such variations and modifications are considered to be within the scope and spirit of the present innovation as defined by the following claims. No element, act, or instruction used in the description of the present application should be construed as critical or essential to the invention unless explicitly described as such. Also, as used herein, the article "a" is intended to include one or more items.

The invention claimed is:

1. A method of detecting a burst error condition on an associated network, said method comprising:
    measuring an interval value (306) between each pair of continuous received packets (304);
    recording said measured interval values in a series of memory elements (308, 310, 312, 314, 316) wherein each interval value is stored in a first memory element (308)) of said series of memory elements and shifted along said series of memory elements (310, 312, 314, 316) when each new interval value is recorded;
    summing (320) a first portion of said recorded interval values and providing a first sum to a first comparator (324) for comparison to a first pre-configured period (328) and detecting a first burst error condition (332) when said first sum is greater than said first pre-configured period (328); and
    summing (318) a second portion of said recorded interval values and providing a second sum to a second comparator (322) for comparison to a second pre-configured period (326) and detecting a second burst error condition (330) when said second sum is less than said second pre-configured period (326),
    wherein said first portion of said recorded interval values and said second portion of said recorded interval values partially overlap.

2. The method of claim 1, further comprising generating a first burst error alarm based on said first burst error condition.

3. The method of claim 2, wherein said first burst error alarm is associated with receiving a fewer number of packets than required for said configured period.

4. The method of claim 1, further comprising generating a second burst error alarm based on said second burst error condition.

5. The method of claim 4, wherein said second burst error alarm is associated with receiving a greater number of packets than allowed for said configured period.

6. The method of claim 1, wherein said first pre-configured period and said second pre-configured period have the same value.

7. The method of claim 1, wherein said series of memory elements are initialized to a value of zero.

8. The method of claim 1, wherein said second sum comprises a greater number of said recorded interval values than said recorded interval values comprised by said first sum.

9. The method of claim 1, wherein said first pre-configured period and said second pre-configured period have the different values.

10. A method of detecting a burst error condition on an associated network, said method comprising:
measuring (406) an interval value between each pair of continuous received packets (404);
recording said measured interval values in a series of memory elements (408, 410, 412, 414, 416) wherein each interval value is stored in a first memory element (408) of said series of memory elements and shifted along said series of memory elements (410, 412, 414, 416) when each new interval value is recorded;
adding (418, 420, 422, 424) said interval value to each recorded interval value as said recorded interval value shifts between memory elements (408, 410, 412, 414, 416);
providing a first additive interval value (422) to a first comparator (428) for comparison to a first pre-configured period (432) and detecting a first burst error condition (436) when said first additive interval value (422) is greater than said first pre-configured period (432); and
providing a second additive interval value (424) to a second comparator (426) for comparison to a second pre-configured period (430) and detecting a second burst error condition (434) when said second additive interval value (424) is less than said second pre-configured period (430),
wherein said first additive interval value comprises a portion of the additive intervals values associated with said series of memory elements.

11. The method of claim 10, further comprising generating a burst error alarm based on said first burst error condition.

12. The method of claim 10, further comprising generating a burst error alarm based on said second burst error condition.

13. The method of claim 10, wherein said first pre-configured period and said second pre-configured period have the same value.

14. A device (202) for detecting burst error conditions on an associated network (204), said device comprising:
an interval counter component (206) for determining an interval value between consecutively received packets;
a memory chain component (208) for providing a storage location for each of a consecutive series of said interval values;
a summation component (210) for providing the capability to combine a plurality of said interval values; and
a comparator component (212) for comparing said combined plurality of said interval values to a pre-configured period and determining if a burst error condition exists,
wherein said comparator component further comprises a first comparator for detecting a burst error condition associated with receiving a smaller number of packets than required during said pre-configured period and a second comparator for detecting a burst error condition associated with receiving a greater number of packets than allowed during a pre-configured period.

15. The device of claim 14, wherein said comparator component further comprises generating an alarm event based on said determined burst error condition.

16. The device of claim 14, wherein said summation component uses a portion of said intervals for summation and provision to said first comparator.

17. The device of claim 14, wherein said interval counter component initializes to zero at startup and resets to zero with the receipt of each packet and said memory chain initializes to zero at startup.

* * * * *